Dec. 10, 1929.  R. RÄSSLER  1,739,179
HEADLIGHT
Filed June 22, 1926
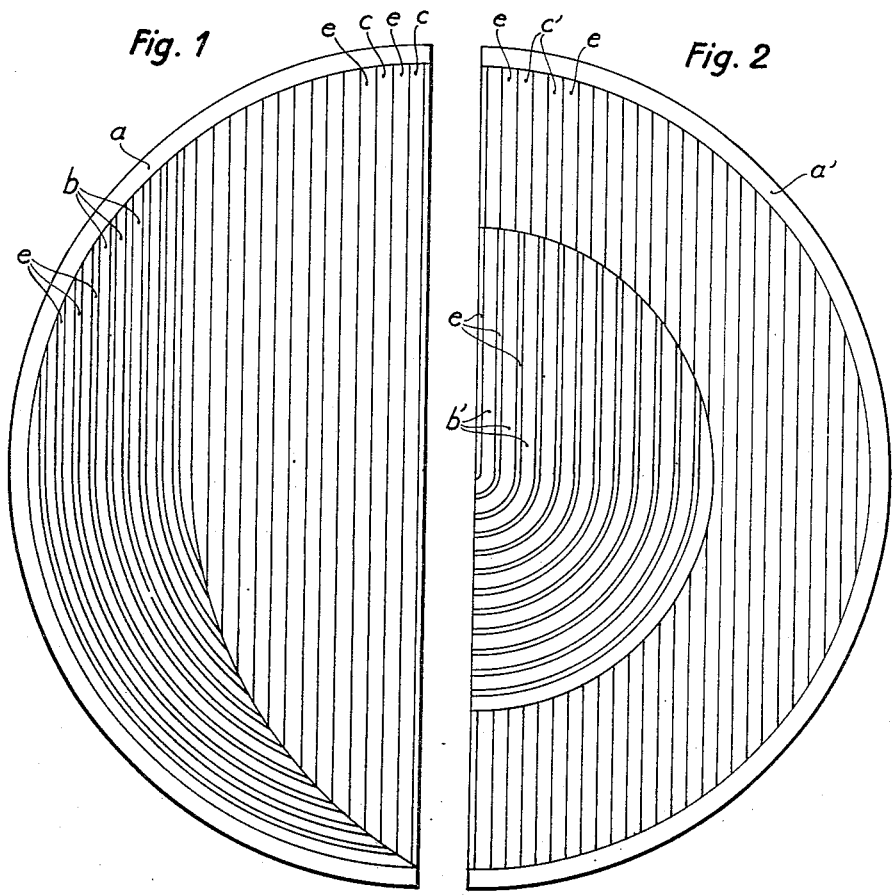
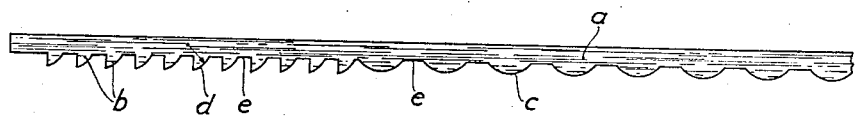
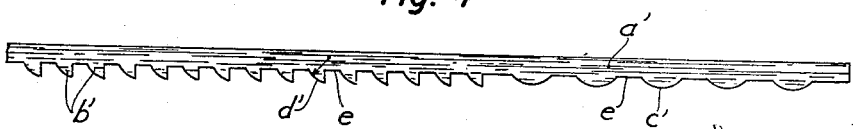
Inventor
Robert Rässler,
by Steward & McKay
his attorneys Patented Dec. 10, 1929

1,739,179

UNITED STATES PATENT OFFICE

ROBERT RÄSSLER, OF STUTTGART, GERMANY, ASSIGNOR TO ROBERT BOSCH AKTIEN-GESELLSCHAFT, OF STUTTGART, GERMANY

HEADLIGHT

Application filed June 22, 1926, Serial No. 117,830, and in Germany September 14, 1925.

This invention relates to headlights for vehicles, as automobiles and motor boats and the like, and more particularly to front or cover glasses for headlights.

The general object of the invention is to produce a good illumination at the sides and on the ground directly in front of the vehicle. A further object is to prevent blinding or dazzle effect, even if a clear glass lamp is used. Another object is to produce a good illumination at a distance, if necessary with only slight diffusion.

According to the invention the front glass located approximately at right angles to the optical axis of the headlight is provided with prismatic ribs extending partly vertically and partly obliquely so that the vertical ribs bend the light rays laterally and outwardly and the inclined ribs bend the rays laterally outwardly and downwardly.

Other objects and features of the invention will appear as the description proceeds. The invention is shown by way of example in the accompanying drawings, in which similar characters of reference indicate corresponding parts in all the views.

In the drawings:

Fig. 1 shows in elevation the left half of a front glass;

Fig. 2 shows in elevation the right half of another front glass of modified form;

Fig. 3 is a horizontal section of the half shown in Fig. 1, drawn on a larger scale;

Fig. 4 is a horizontal section of the half shown in Fig. 2, drawn on a larger scale.

Figs. 1 and 3 illustrate an embodiment of my invention wherein prismatic ribs $b$, $b'$ are provided on the front cover glass $a$ running concentrically in the lower half and continuing vertically in the upper half and further there are provided vertical cylindrical ribs $c$ which diffuse the light to both sides but to a less degree than the ribs $b$. Parallel plane strips $e$ are left between the individual ribs. The ribs $b$ are adapted to provide lateral and ground illumination and the ribs $c$ the diffused light for distant illumination. As can be seen from Fig. 3 the face $d$ of the prismatic ribs $b$ turned towards the source of light is convexly curved by which means the formation of bands of light such as may easily result from devices employing straight prisms with plane surfaces between them, is avoided. It will be noted by referring to Figs. 1 and 3 that the prismatic ribs $b$ are arranged in two outer areas in the form of upper vertically extending ribs and lower obliquely and inwardly extending ribs, while the cylindrical ribs $c$ which diffuse or deflect the light to both sides but to a less degree than the prismatic ribs are arranged on the glass $a$ on an area within that on which said prismatic ribs $b$ are formed.

In the modification represented in Figs. 2 and 4 the prismatic ribs $b'$ are arranged on an inner area of the cover glass $a'$, said ribs $b$, as shown, being distributed in an upper series of vertical ribs, said vertical ribs being continued in the lower part of the inner area in the form of oblique ribs which in the present instance take the course of concentric circular arcs. This inner area is as shown enclosed by an outer concentric area on which the vertical cylindrical ribs $c'$ adapted to diffuse the light to both sides but to a less degree than the prismatic ribs $b'$ are arranged. In this modification again the face $d'$ of the prismatic ribs $b'$, which is turned toward the source of light is convexly curved to avoid uneven diffusion or deflection. In both examples the field occupied by the cylindrical ribs producing but little diffusion is greater than that portion of the surface of the glass covered by the prismatic ribs. It is obvious that the two fields or areas may be laid out in other ways than those shown.

In both cases a far reaching illumination is obtained from that portion of the head light which is provided with ribs producing weak diffusion, which also light up the sides of the road to a certain extent. In addition however, that portion of the front or cover glass having ribs producing strong diffusion gives immediately in front of the vehicle, an excellent illumination of the sides of the road and the ground without any objectionable clear or dark streaks. This preferred blending of the two different illuminations is effected without a blinding or dazzling effect notwithstanding the fact that a clear glass incandescent lamp is used in the headlight.

It will be understood that suitable modifications may be made in the general design and structure details of the invention, as herein shown and described, without departing from the spirit of the invention or from the appended claims.

I claim:

1. A headlight lens having an outer ring of vertically extending cylindrical ribs and a circular field within such outer ring, such field having prismatic ribs, portions of which extend in the direction of their length vertically of the optical axis of the headlight and further continuing portions of such prismatic ribs extending in the direction of their length in the form of concentric arcs.

2. A headlight lens having deflecting ribs, some of which extend vertically throughout their length, and others of which extend above the axis of the lens vertically and below the axis of the lens in the form of arcs substantially concentric with the axis of the lens, such wholly vertically extending portions having deflecting surfaces adapted and arranged to bend light rays approaching the lens in a direction parallel to the axis of the lens to both sides of the lens, and such partly vertical and partly curved ribs having deflecting surfaces adapted and arranged to bend light rays away from the axis of the lens only.

3. A headlight lens having a portion of its area covered with cylindrical ribs extending vertically throughout their entire length, and the remaining portion of the lens area covered with prismatic ribs, said prismatic ribs having their upper portions extending vertically above the axis of the lens in the direction of their length and their lower portions extending below the axis of the lens in arcs concentric with the axis of the lens.

In testimony whereof I have hereunto affixed my signature.

ROBERT RÄSSLER.